United States Patent
Tsao

(10) Patent No.: US 9,358,490 B2
(45) Date of Patent: Jun. 7, 2016

(54) AIR WASHER OF MAKE-UP AIR UNIT

(71) Applicant: TAIWAN SEMICONDUCTOR MANUFACTURING CO., LTD., Hsinchu (TW)

(72) Inventor: Chih-Ming Tsao, Miaoli (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 63 days.

(21) Appl. No.: 14/199,746

(22) Filed: Mar. 6, 2014

(65) Prior Publication Data
US 2015/0251132 A1  Sep. 10, 2015

(51) Int. Cl.
*B01D 47/06* (2006.01)
*B01D 50/00* (2006.01)
*B01D 46/00* (2006.01)
*B01D 46/12* (2006.01)

(52) U.S. Cl.
CPC ............ *B01D 47/06* (2013.01); *B01D 46/0071* (2013.01); *B01D 50/006* (2013.01); *B01D 46/0082* (2013.01); *B01D 46/125* (2013.01)

(58) Field of Classification Search
None
See application file for complete search history.

(56) References Cited

U.S. PATENT DOCUMENTS 2,387,473 A * 10/1945 Spitzka ................. F24F 5/0035
  261/118
3,006,436 A * 10/1961 Starbuck ................ B01D 45/10
  261/95

* cited by examiner

*Primary Examiner* — Duane Smith
*Assistant Examiner* — Phillip Shao
(74) *Attorney, Agent, or Firm* — McDermott Will & Emery LLP

(57) ABSTRACT

An air washer includes a contamination removal membrane and a nozzle rack. The contamination removal membrane purifies an outdoor air for a clean room. The nozzle rack sprays water on the contamination removal membrane. The nozzle rack includes a supply pipe, a plurality of spray pipes connecting to the supply pipe and a plurality of nozzles fixed on the spray pipes to spray the water on the contamination removal membrane. The contamination removal membrane is a cellulose paper sheet, an agglomeration ceramic pad, a stainless steel filter or the combination thereof. In addition, a make-up air unit having the air washer is also disclosed therein.

18 Claims, 9 Drawing Sheets

AIR WASHER OF MAKE-UP AIR UNIT

BACKGROUND

An important semiconductor manufacturing process, such as a lithography (exposure) process, must be performed in a clean room where lithography machines are located. Typically, such a semiconductor manufacturing process is performed under a certain air condition. Namely, airborne molecular contamination (AMC) in the clean room must be precisely controlled, such that the semiconductor manufacturing process can be successfully performed. Airborne molecular contamination can include total organic compound (TOC), $NH_3$, and total sulfur (TS), for example.

A conventional clean room includes multiple floors and a plurality of machines for manufacturing semiconductors are disposed therein. A conventional air supply system is deployed in the clean room to provide clean air for the clean room. The conventional air system utilizes a make-up air unit (MAU) to remove the airborne molecular contamination (AMC) of the outdoor air. A conventional make-up air unit includes an air washer to wash the outdoor air with spraying water. However, the water spray based air washer needs a large amount of water for scrubbing the outdoor air and lots of electricity for pumping the water.

The conventional make-up air unit needs a water eliminator to prevent an air flow with water droplets to the downstream of the MAU. The water eliminator may cause a pressure drop of the airflow and a higher pressure drop may cause a higher MAU fan power consumption.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
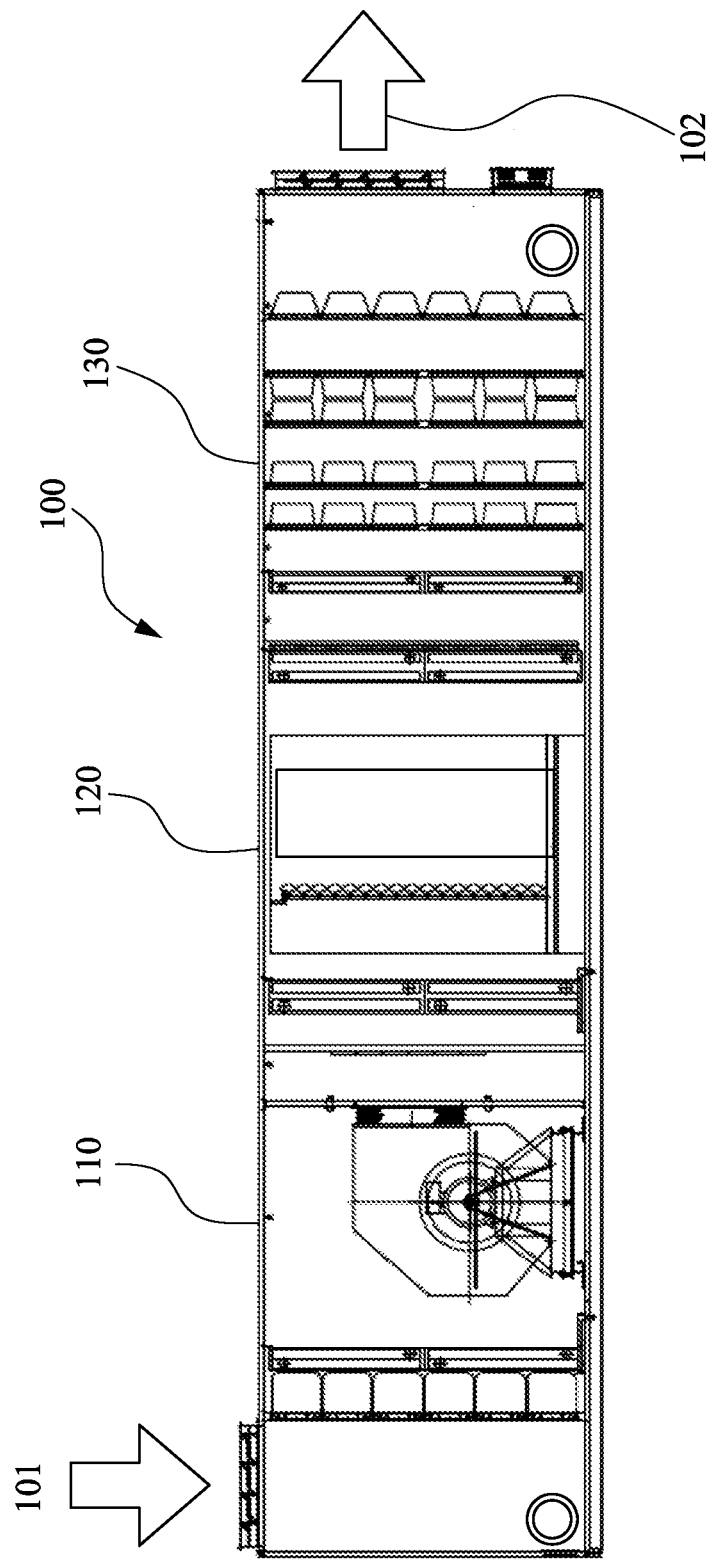
FIG. 1 is a schematic diagram showing a make-up air unit according to various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Moreover, the singular forms "a," "an" and "the" used herein include plural referents unless the context clearly dictates otherwise. Therefore, reference to, for example, a semiconductor well includes embodiments having two or more such semiconductor wells, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

FIG. 1 is a schematic diagram showing a make-up air unit according to various embodiments of the present disclosure. The make-up air unit 100 includes a fan 110, an air washer 120 and at least one filter 130. An outdoor air 101 is delivered to the air washer 120 by the fan 110 to remove airborne molecular contamination (AMC) of the outdoor air. The washed air further passes through the filter 130 to further filter out the airborne molecular contamination in the outdoor air. Therefore, a clean air 102 can be delivered into a clean room where the semiconductor manufacturing devices are located.

Figure 2:
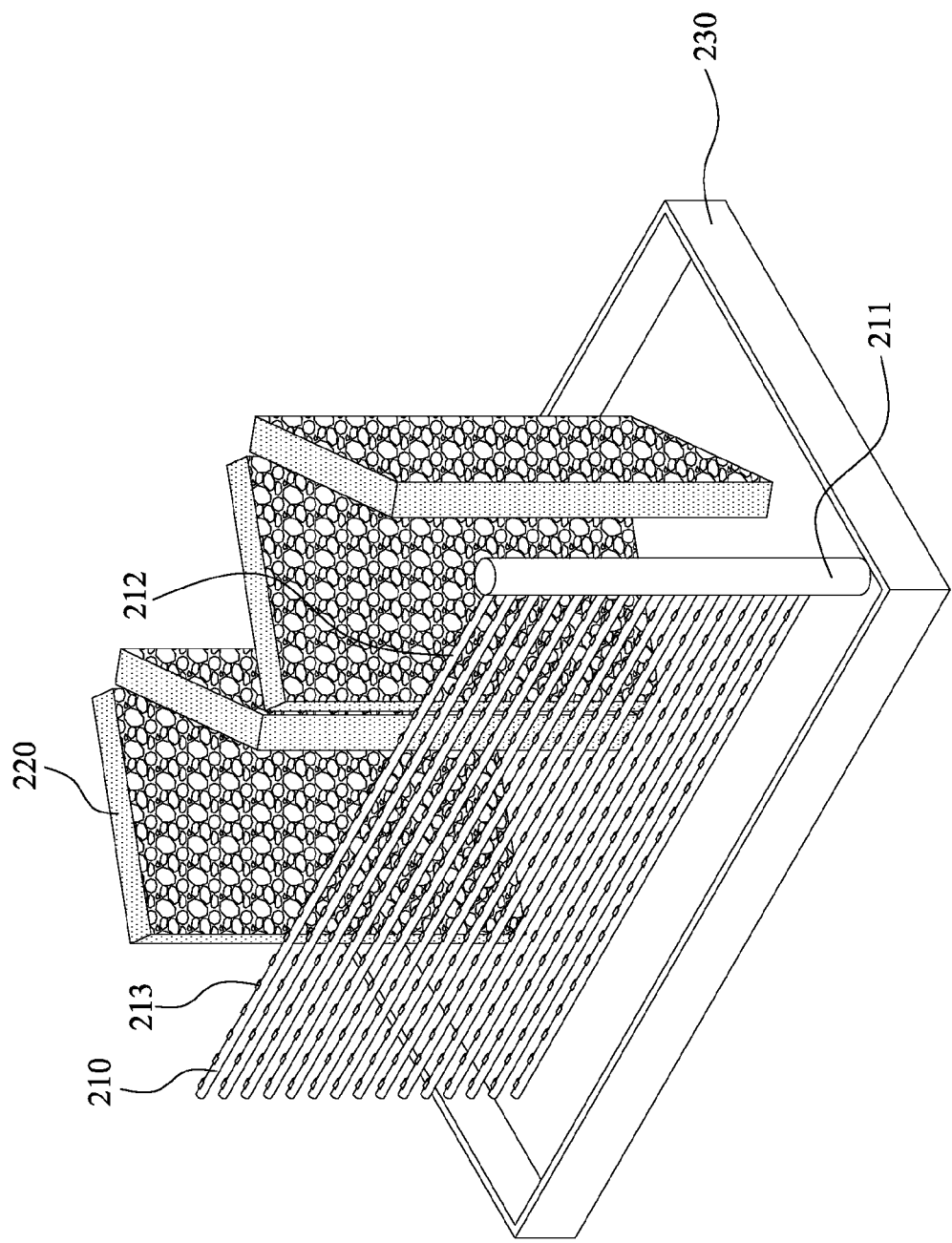
FIG. 2 is a schematic diagram showing an air washer of a make-up air unit according to various embodiments of the present disclosure.

FIG. 2 is a schematic diagram showing an air washer of a make-up air unit according to various embodiments of the present disclosure. The air washer includes a nozzle rack 210 to spray water toward a contamination removal membrane 220 and the outdoor air is delivered from an outside of the nozzle rack 210 to pass through the contamination removal membrane 220 to remove the airborne molecular contamination of the outdoor air. Therefore, the airborne molecular contamination in a clean room can be effectively controlled. The airborne molecular contamination can include, e.g., total organic compound (TOC), $NH_3$, and total sulfur (TS). Moreover, a water recovery tray 230 is positioned under the nozzle rack 210 and the contamination removal membrane 220 to catch and recycle the water.

Figure 6A:
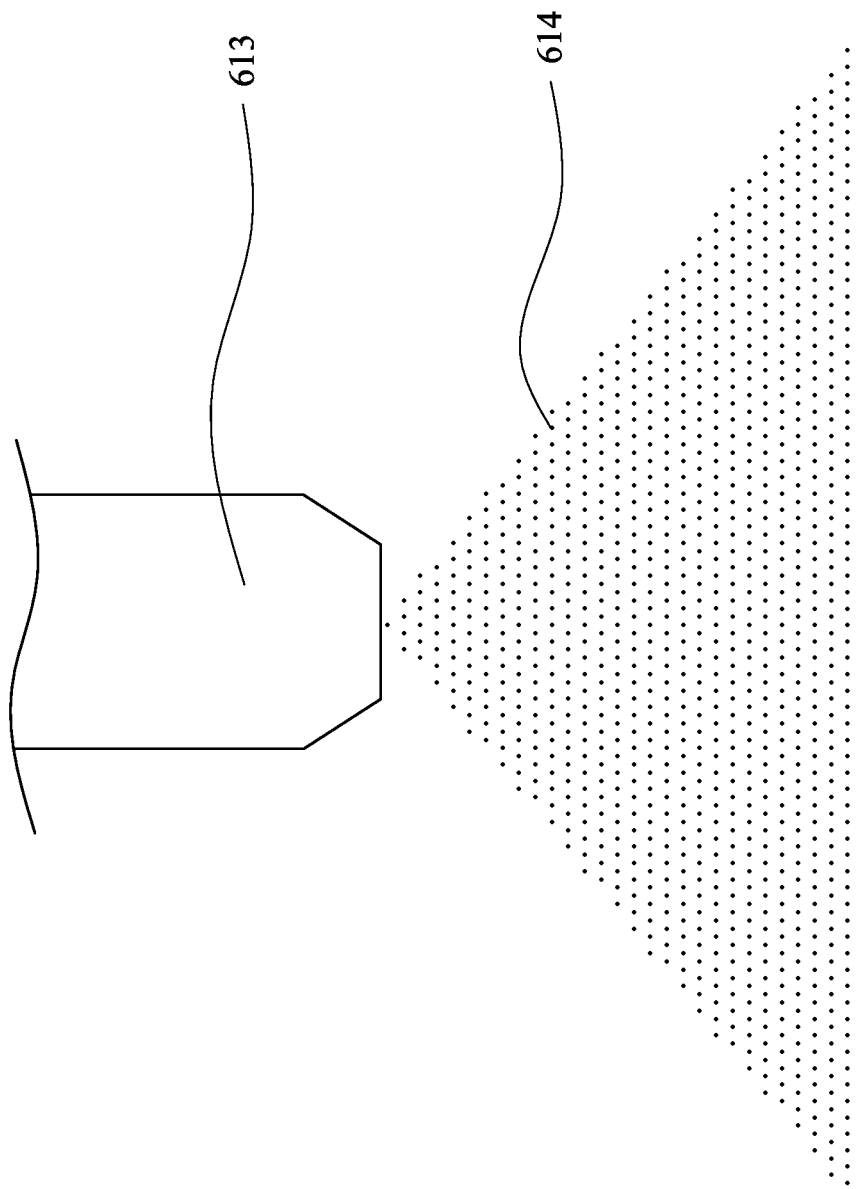
FIG. 6A is a schematic diagram showing a nozzle for an air washer of a make-up air unit according to various embodiments of the present disclosure.
Figure 6A:
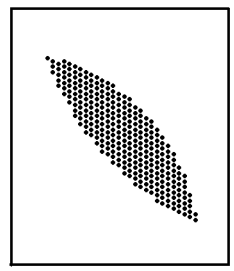
Figure 6B:
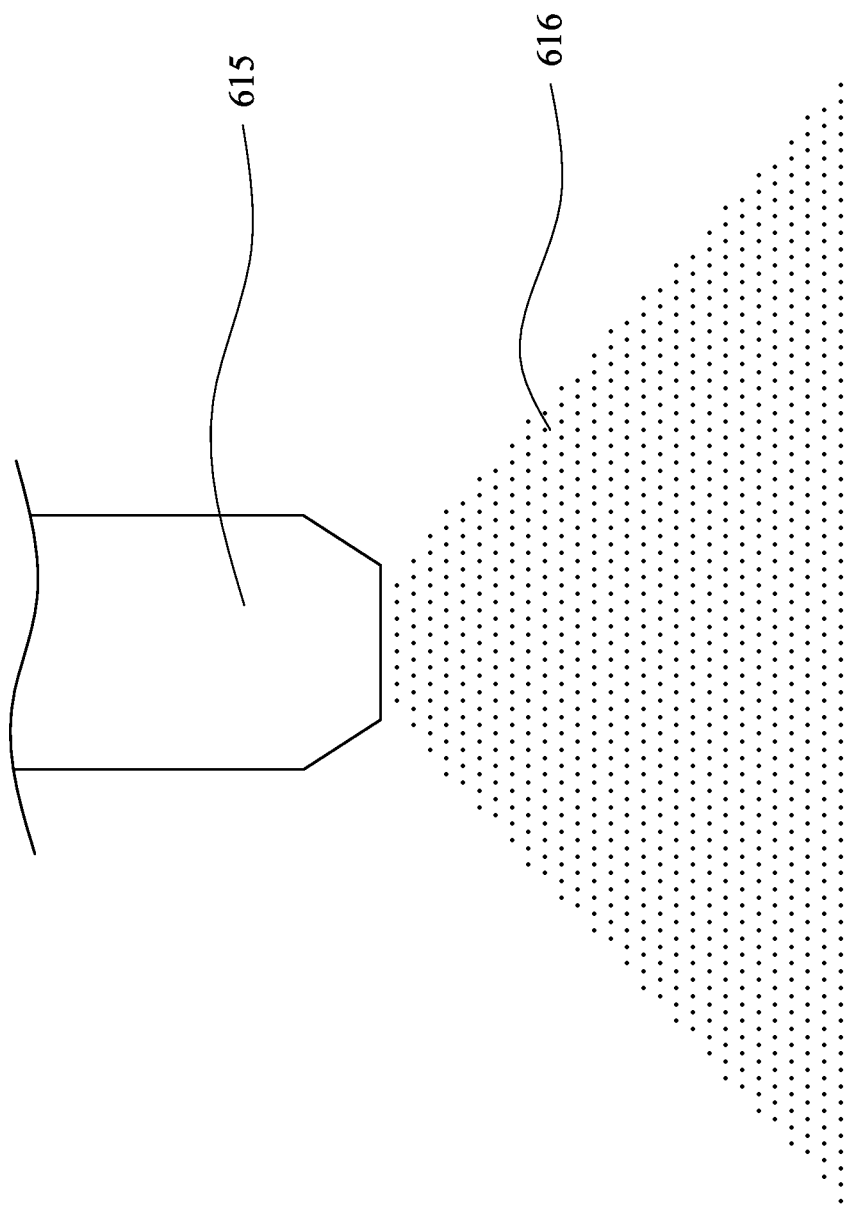
FIG. 6B is a schematic diagram showing a nozzle for an air washer of a make-up air unit according to various embodiments of the present disclosure.
Figure 6B:
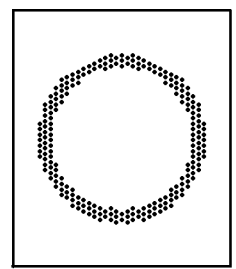

The nozzle rack 210 includes a supply pipe 211, spray pipes 212 connecting to the supply pipe 211, and nozzles 213 fixed on the spray pipes 212. The water is pumped to the supply pipe 211, and further delivered to the spray pipes 212. The nozzles 213 spray the water toward the contamination removal membrane 220. Further refer to FIGS. 6A and 6B. The nozzle can be a sector nozzle 613 having a spray pattern 614 as shown in FIG. 6A, and a sectional view of the spray pattern 614 of the sector nozzle 613 is sown on a left side of FIG. 6A. In various embodiments, the sector nozzle 613 is fixed on the spray pipe of the nozzle rack to form an included angle with a vertical direction about 0 degrees to about 30 degrees, that is, the nozzles 213 spray the water downward. In various embodiments, the included angle is about 10 degrees. In various embodiments, a spray angle of the sector nozzle 613 is about 115 degrees to about 145 degrees. In various embodiments, a spray angle of the sector nozzle 613 is about 130 degrees. Optionally, the nozzle can be a cone nozzle 615 having a spray pattern 616 as shown in FIG. 6B, and a sectional view of the spray pattern 616 of the cone nozzle 615 is shown on a left side of FIG. 6B. In various embodiments, the cone nozzle 615 is fixed on the spray pipe of the nozzle rack to form an included angle with a vertical direction about 80 degrees to about 100 degrees. In various embodiments, the included angle is about 90 degrees, that is, parallel to the direction of the airflow. In various embodiments, a spray angle of the cone nozzle 615 is about 130 degrees to about 160 degrees. In various embodiments, a spray angle of the cone nozzle 615 is about 145 degrees.

Furthermore, the water is sprayed toward the contamination removal membrane 220. The nozzles 213 can be aligned parallel to the direction of the airflow. That is, the nozzles 213 can be horizontally fixed on the spray pipes 212. Optionally, the nozzles 213 can be oblique to the direction of the airflow, for example, oblique to the horizontal plane, about an included angle. In various embodiments, the included angle is about 0 degrees to 60 degrees. In further various embodiments, the included angle can be about 0 degrees to 45 degrees. In further various embodiments, the included angle can be about 0 degrees to 30 degrees. The airflow can blow the water to the contamination removal membrane 220.

Figure 8:
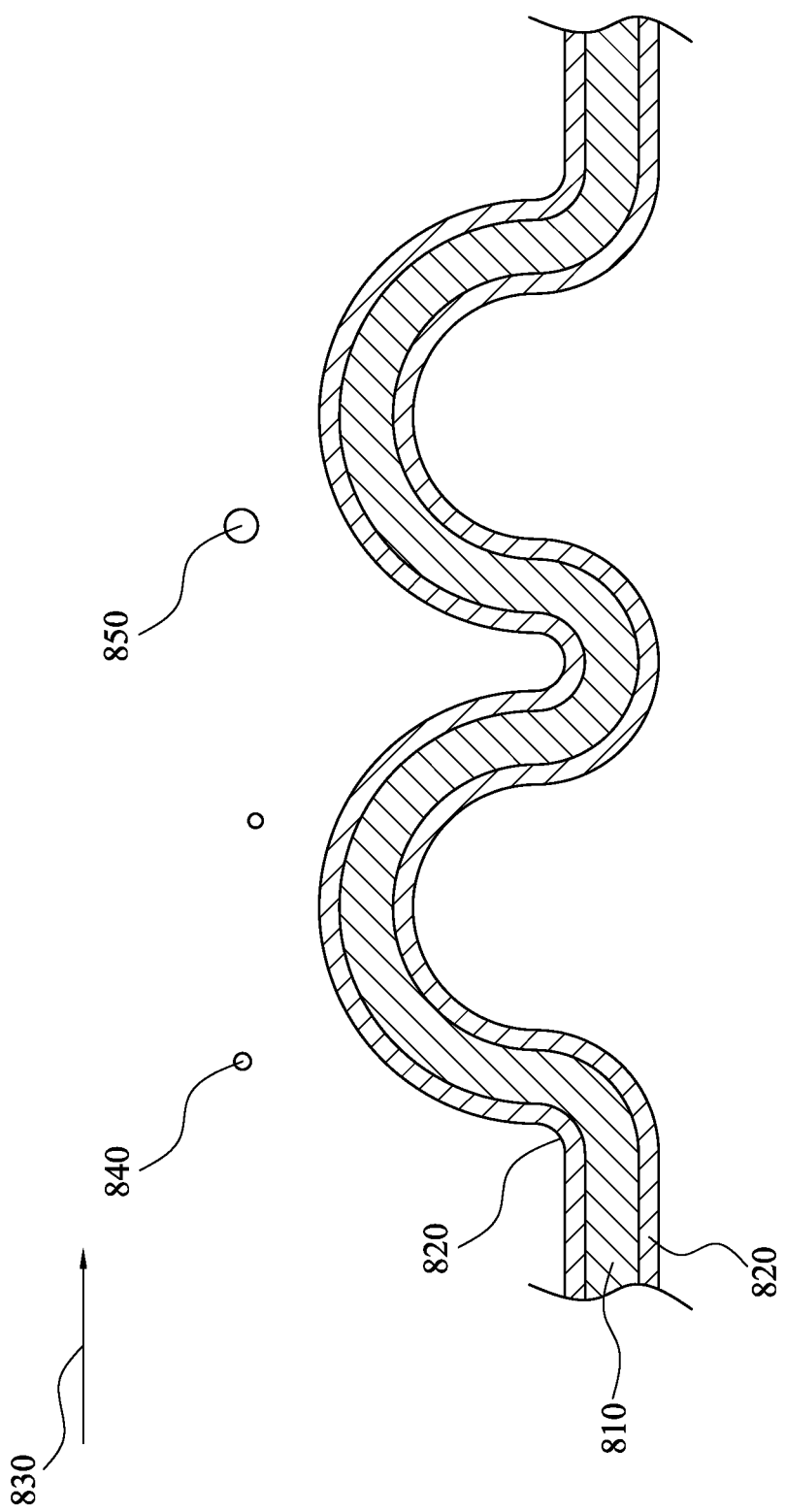
FIG. 8 is a schematic partial cross-sectional view showing a structure of a contamination removal membrane of an air washer of a make-up air unit according to various embodiments of the present disclosure.

Refer to FIG. 8. While the water adhering to the contamination removal membrane, the water films 820 are formed on the membrane 810. The airflow 830 including micro particles 840, e.g. gaseous molecules, and particles 850, e.g. solid particles, from an outside of an air washer of a make-up air unit is enforced to pass through the contamination removal membrane. The water films 820 on the membrane 810 of the contamination removal membrane can catch the micro particles 840 and particles 850 in the outside air to clean the outside air for the clean room. Since there are a lot of the membranes 810 to form the contamination removal membrane and the membranes 810 are zigzag, most of the micro particles 840 and particles 850 in the airflow 830 can touch the water films 820 on the membranes 810. Therefore, most of the micro particles 840 and particles 850 in the airflow 830 can be removed.

In addition, the water forms the water films 820 on the membranes 810 to catch the micro particles 840 and particles 850 rather than to form a water curtain in the air to catch the micro particles 840 and particles 850. Therefore, the volume of usage amount of the water can be effectively reduced. Moreover, the size of the pump for pumping the water to the nozzles can also be reduced. Therefore, the electrical power consumption of the air washer of the make-up air unit is also reduced.

The contamination removal membrane 220 is a mass transfer enhance media, e.g., a cellulose paper sheet, an agglomeration ceramic pad, a stainless steel filter or the combination thereof. The cellulose paper sheet can be a CELdek® pads (Munters Corporation, Sweden) or the like. The agglomeration ceramic pad can be a honeycomb-structured ceramic pad. The stainless steel filter can be composed of multi-layers of pleated and corrugated stainless steel screen wires. Stainless bars are attached to the both sides of filter pack for adding rigidity thereof. And, the construction can effectively offer a maximum filter surface area. Hereinafter, several types of contamination removal membrane are provided as examples for explanation, but embodiments of the present disclosure are not limited thereto. It should be understood that various changes, substitutions and alterations can be made herein without departing from the spirit and scope of the disclosure.

Figure 3:
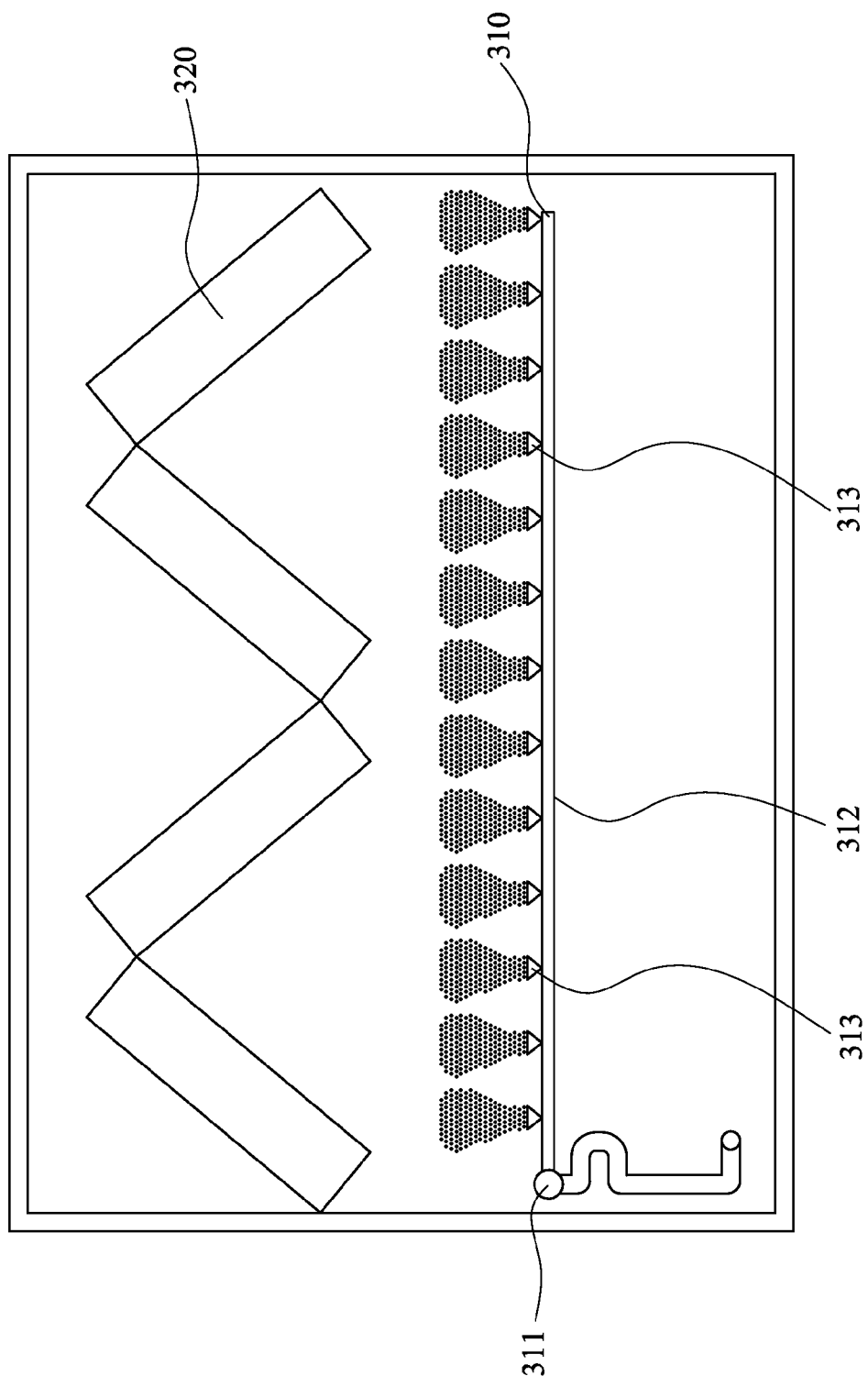
FIG. 3 is a schematic top view showing an air washer of a make-up air unit according to various embodiments of the present disclosure.

Refer to FIG. 3. FIG. 3 is a schematic top view showing an air washer of a make-up air unit according to various embodiments of the present disclosure. The air washer is similar to the air washer depicted in FIG. 2. The air washer includes a nozzle rack 310 and a contamination removal membrane 320. The contamination removal membrane 320 is a W-shaped contamination removal membrane. The nozzle rack 310 includes a supply pipe 311, spray pipes 312 connecting to the spray pipes 312, and nozzles 313 are formed on the spray pipes 312 to spray the water toward the contamination removal membrane 320. The nozzles 313 can be sector nozzles or cone nozzles. The contamination removal membrane 320 is formed by a CELdek® pads (Munters Corporation, Sweden) or the like, and the thickness of the contamination removal membrane 320 is about 250 mm to 350 mm. In various embodiments, the face velocity on the contamination removal membrane 320 is about 2.00 m/s to 2.5 m/s. In various embodiments, the total surface area of the contamination removal membrane 320 is more than 15 $m^2$, and the volumetric flow rate of the air washer is more than 12000 CMH (Cubic Meter Peter Hour). The power of the water pump can be reduced from about 37 kW to 4 kW and the power of the fan motor can be reduced from 27.8 kW to 21.2 kW. Therefore, the energy performance of the embodiment of the air washer can reach over 70% of electricity saving. The AMC removal efficiency can also be increased because that the total area of the water films on the zigzag membrane is increased compared with the conventional water curtain design.

Figure 4:
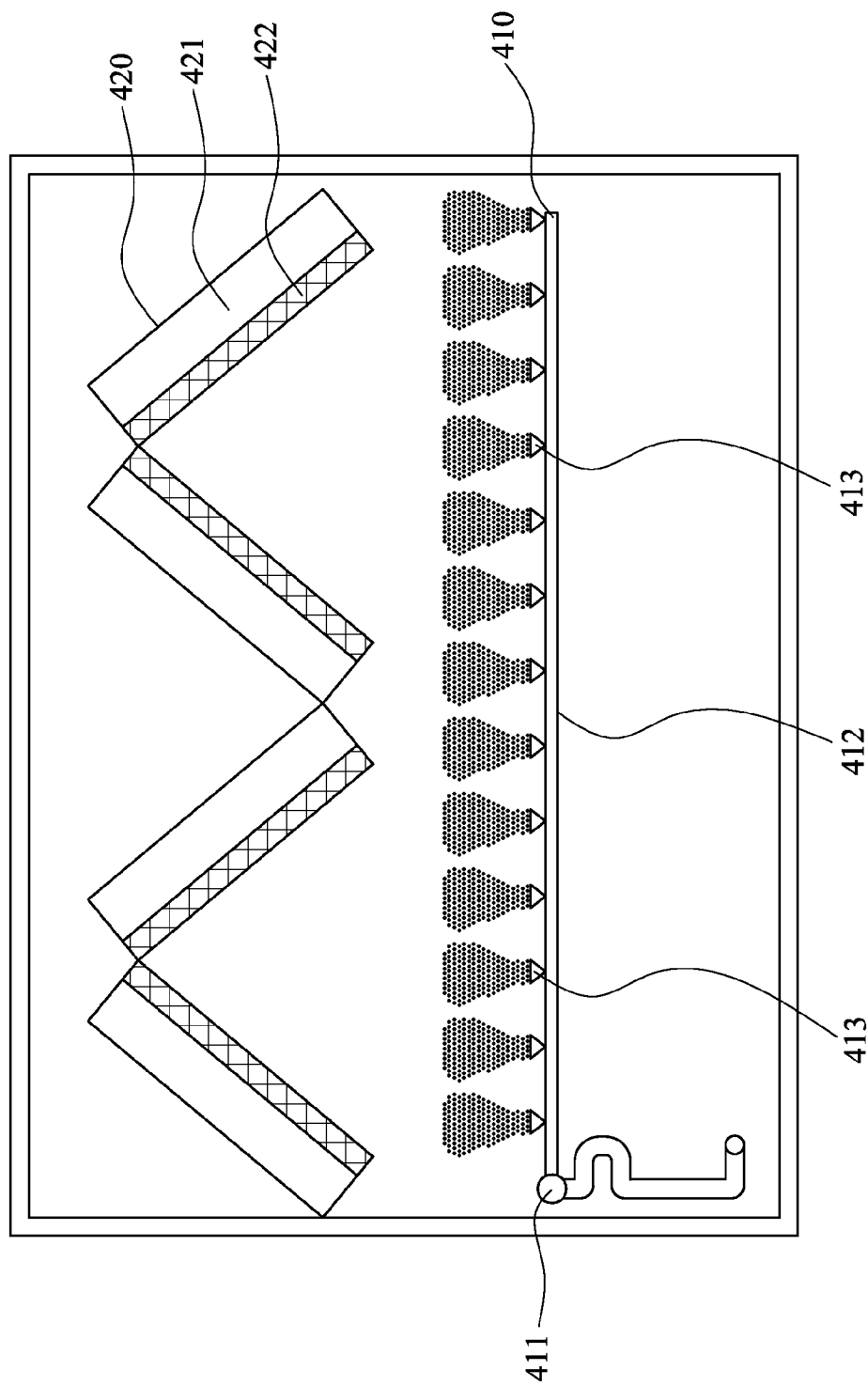
FIG. 4 is a schematic top view showing an air washer of a make-up air unit according to various embodiments of the present disclosure.

Refer to FIG. 4. FIG. 4 is a schematic top view showing an air washer of a make-up air unit according to various embodiments of the present disclosure. The air washer includes a nozzle rack 410 and a contamination removal membrane 420. The contamination removal membrane 420 is a W-shaped contamination removal membrane.

The nozzle rack 410 includes a supply pipe 411, spray pipes 412 connecting to the spray pipes 412, and nozzles 413 are formed on the spray pipes 412 to spray the water toward the contamination removal membrane 420. The nozzles 413 can be sector nozzles or cone nozzles.

The contamination removal membrane 420 includes cellulose paper sheets 421 and agglomeration ceramic pads 422. The cellulose paper sheets 421 can be, for example, CELdek® pads or the like. The agglomeration ceramic pads 422 can be, for example, honeycomb-structured ceramic membranes. The agglomeration ceramic pads 422 can also be replaced with stainless steel filters. The thickness of the cellulose paper sheets is about 150 mm to 250 mm and the thickness of the agglomeration ceramic pads 422 is about 50 mm to 150 mm.

The face velocity on the contamination removal membrane 420 is about 2.00 m/s to 2.5 m/s. In various embodiments, the total surface area of the contamination removal membrane 420 is more than 15 m$^2$, and the volumetric flow rate of the air washer is more than 12000 CMH (Cubic Meter Peter Hour). The power of the water pump can be reduced from about 37 kW to 4 kW and the power of the fan motor can be reduced from 27.8 kW to 21.2 kW. Therefore, the energy performance of the embodiment of the air washer can reach over 70% of electricity saving. The AMC removal efficiency can also be increased because that the total area of the water films on the zigzag membrane is increased compared with the conventional water curtain design.

Figure 5:
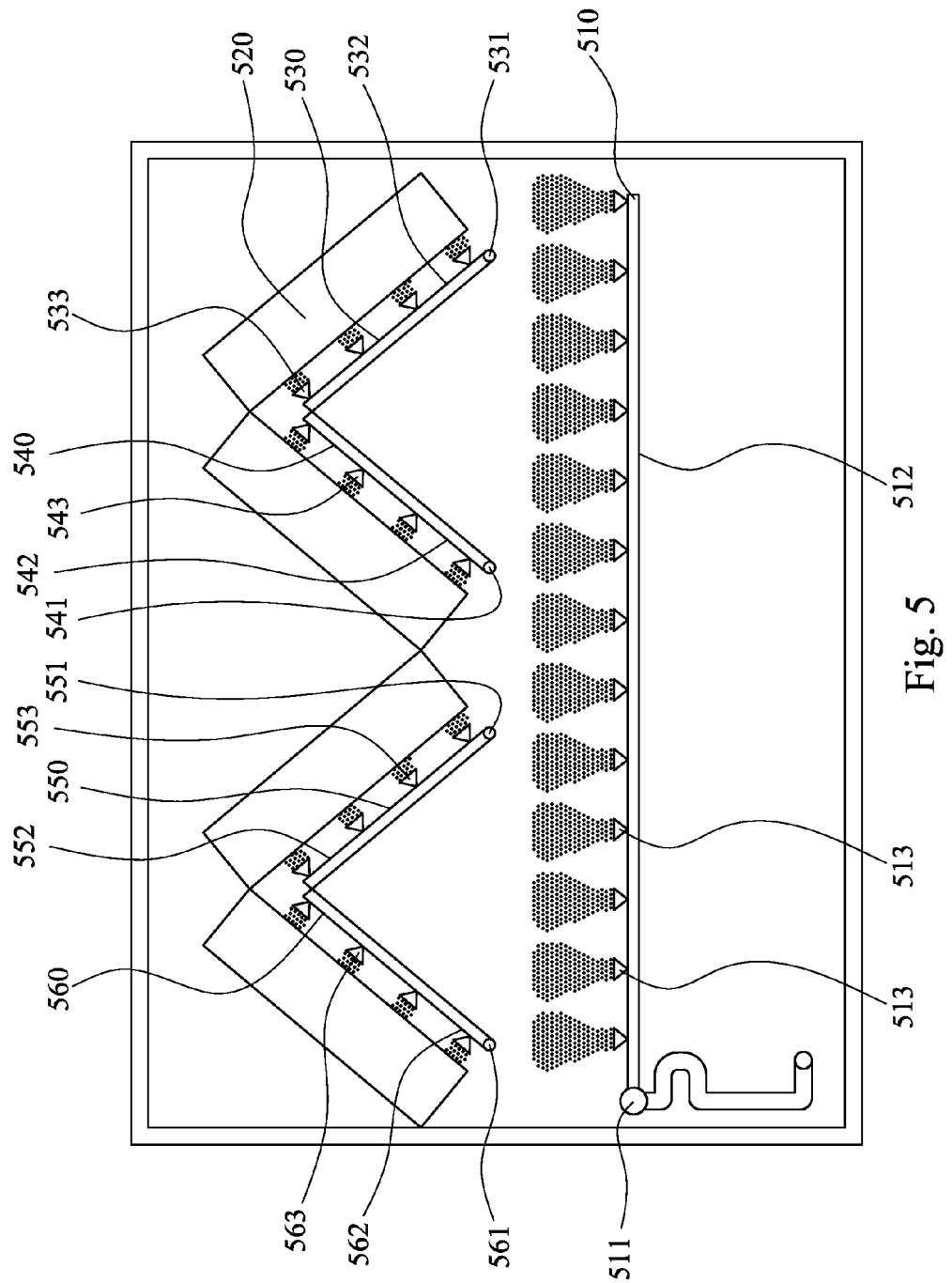
FIG. 5 is a schematic top view showing an air washer of a make-up air unit according to various embodiments of the present disclosure.

Refer to FIG. 5. FIG. 5 is a schematic top view showing an air washer of a make-up air unit according to various embodiments of the present disclosure. The air washer includes a first nozzle rack 510, at least one auxiliary nozzle rack, i.e., a second nozzle rack 530, a third nozzle rack 540, a fourth nozzle rack 550 and a fifth nozzle rack 560, and a contamination removal membrane 420. The contamination removal membrane 520 is, for example, a W-shaped contamination removal membrane. The auxiliary nozzle rack is positioned between the contamination removal membrane 420 and the first nozzle rack 510. In addition, the auxiliary nozzle rack is, for example, parallel to the contamination removal membrane 420 to provide more water on the contamination removal membrane 420.

The first nozzle rack 510 includes, for example, a supply pipe 511, spray pipes 512 connecting to the spray pipes 512, and nozzles 513 are formed on the spray pipes 512 to spray the water toward the contamination removal membrane 520. The nozzles 513 can be sector nozzles or cone nozzles. The second nozzle rack 530 includes, for example, a second supply pipe 531, second spray pipes 532 and second nozzles 533. The third nozzle rack 540 includes, for example, a third supply pipe 541, third spray pipes 542 and third nozzles 543. Similarly, the fourth nozzle rack 550 includes, for example, a fourth supply pipe 551, fourth spray pipes 552 and fourth nozzles 553. The fifth nozzle rack 560 includes, for example, a fifth supply pipe 561, a fifth spray pipes 562 and fifth nozzles 563.

The contamination removal membrane 520 can be, for example, a cellulose paper sheets, and the cellulose paper sheets can be CELdek® pads or the like. The thickness of the contamination removal membrane 520 is about 250 mm to 350 mm In addition, the face velocity on the contamination removal membrane 520 is about 2.00 m/s to 2.5 m/s. The power of the water pump and the fan motor is a little bit higher than the 4 kW and 21.2 kW, and the energy performance of the embodiment of the air washer can also better than the conventional air washer. The AMC removal efficiency can also be a little bit increased due to more water on the zigzag membrane.

Figure 7A:
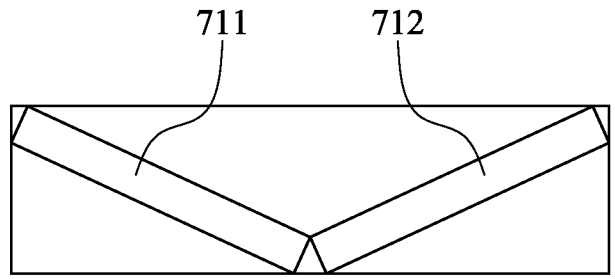
FIGS. 7A-7D are schematic diagrams showing arrangements of contamination removal membranes of air washers of make-up air units according to various embodiments of the present disclosure.

Refer to FIGS. 7A-7D. FIGS. 7A-7D are schematic diagrams showing arrangements of contamination removal membranes of air washers of make-up air units according to various embodiments of the present disclosure. In FIG. 7A, the contamination removal membrane is a V-shaped contamination removal membrane formed by a first contamination removal pad 711 and a second contamination removal pad 712.

Figure 7B:
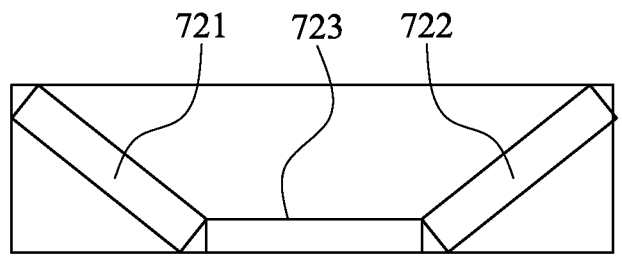

In FIG. 7B, the contamination removal membrane is formed by a first contamination removal pad 721, a second contamination removal pad 722 and a third contamination removal pad 723. The third contamination removal pad 723 is positioned between the first contamination removal pad 721 and the second contamination removal pad 722. The third contamination removal pad 723 perpendicular to the direction of the airflow, and the first contamination removal pad 711 and the second contamination removal pad 712 are oblique to the direction of the airflow to increase the surface area to purify the outdoor air.

Figure 7C:
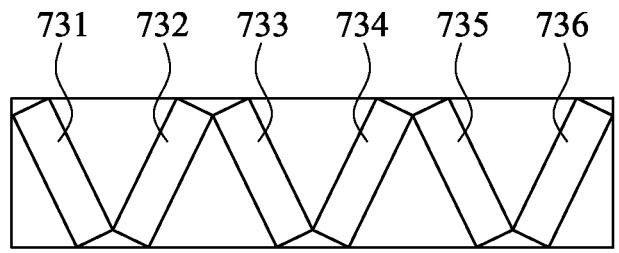

In FIG. 7C, the contamination removal membrane includes, for example, multiple V-shaped contamination removal membranes. For example, a first contamination removal pad 731 and a second contamination removal pad 732 form a V-shaped contamination removal membrane, a third contamination removal pad 733 and a fourth contamination removal pad 734 form another V-shaped contamination removal membrane, and a fifth contamination removal pad 735 and a sixth contamination removal pad 736 form further another V-shaped contamination removal membrane to further increase the area of the contamination removal membrane.

Figure 7D:
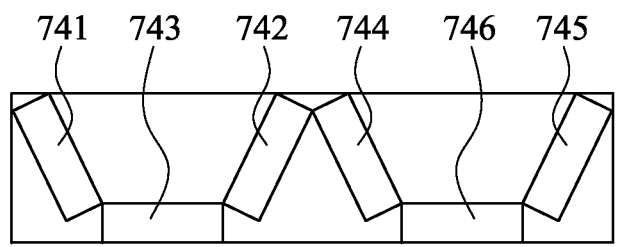

In FIG. 7D, the contamination removal membrane is formed by a first contamination removal pad 741, a second contamination removal pad 742, a third contamination removal pad 743, a fourth contamination removal pad 744, a fifth contamination removal pad 745 and a sixth contamination removal pad 746. The third contamination removal pad 743 is positioned between the first contamination removal pad 741 and the second contamination removal pad 742. The third contamination removal pad 743 perpendicular to the direction of the airflow, and the first contamination removal pad 741 and the second contamination removal pad 742 are oblique to the direction of the airflow to increase the surface area to purify the outdoor air. The sixth contamination removal pad 746 is positioned between the fourth contamination removal pad 744 and the fifth contamination removal pad 745. The sixth contamination removal pad 746 perpendicular to the direction of the airflow, and the fourth contamination removal pad 744 and the fifth contamination removal pad 745 are oblique to the direction of the airflow to increase the surface area to purify the outdoor air.

An air washer is disclosed that includes a contamination removal membrane to purify an outdoor air for a clean room and a nozzle rack to spray water on the contamination removal membrane. In various embodiments, the nozzle rack further includes a supply pipe, a plurality of spray pipes connecting to the supply pipe and a plurality of nozzles fixed on the spray pipes to spray the water on the contamination removal membrane.

In various embodiments, the contamination removal membrane is a cellulose paper sheet. In various embodiments, the contamination removal membrane is a CELdek® pad or the like and a thickness of the contamination removal membrane is about 250 mm to 350 mm. In various embodiments, the contamination removal membrane is a cellulose paper sheet and an agglomeration ceramic pad, and a thickness of the cellulose paper sheet is about 150 mm to 250 mm, and a thickness of the agglomeration ceramic pad is about 50 mm to 150 mm. In various embodiments, the contamination removal membrane is a cellulose paper sheet and a stainless steel filter.

In various embodiments, a water recovery tray is under the contamination removal membrane and the nozzle rack to collect the water. In various embodiments, the nozzles can be sector nozzles or cone nozzles. In various embodiments, the nozzles are parallel to an airflow direction of the outdoor air.

In various embodiments, the nozzles are oblique to an airflow direction of the outdoor air about an included angle. In various embodiments, the sector nozzles form an included angle with the vertical direction about 0 degrees to about 30 degrees. In various embodiments, the included angle is about 10 degrees. In various embodiments, a spray angle of the sector nozzle is about 115 degrees to about 145 degrees. In various embodiments, a spray angle of the sector nozzle is about 130 degrees. In various embodiments, the cone nozzles form an included angle with a vertical direction about 80 degrees to about 100 degrees. In various embodiments, the included angle is about 90 degrees, that is, parallel to the airflow direction. In various embodiments, a spray angle of the cone nozzle is about 130 degrees to about 160 degrees. In various embodiments, a spray angle of the cone nozzle is about 145 degrees.

In various embodiments, the contamination removal membrane includes a first contamination removal pad and a second contamination removal pad to form a V-shaped contamination removal membrane. In various embodiments, auxiliary nozzle racks respectively parallel to the first contamination removal pad and the second contamination removal pad are equipped.

In various embodiments, the contamination removal membrane comprises a first contamination removal pad, a second contamination removal pad and a third contamination removal pad, the third contamination removal pad is perpendicular to an airflow direction of the outdoor air, and the first contamination removal pad and the second contamination removal pad are oblique to the airflow direction.

A make-up air unit is disclosed that includes a fan delivering an outdoor air to a clean room, an air washer and a plurality of filters. In various embodiments, the air washer includes a contamination removal membrane to filter out airborne molecular contaminations in the outdoor air for the clean room and a nozzle rack to spray water on the contamination removal membrane to form water films on the contamination removal membrane to catch the airborne molecular contaminations. In various embodiments, the nozzle rack further includes a supply pipe, a plurality of spray pipes connecting to the supply pipe and a plurality of nozzles fixed on the spray pipes to spray the water on the contamination removal membrane.

Moreover, a plurality of filters are further equipped in the downstream position of the air washer to further purify the outdoor air so as to further reduce the airborne molecular contaminations therein.

In various embodiments, the contamination removal membrane is a cellulose paper sheet, an agglomeration ceramic pad, a stainless steel filter or the combination thereof.

An air washer is disclosed that includes a contamination removal membrane, a first nozzle rack, a second nozzle rack and a third nozzle rack. The contamination removal membrane can filter out airborne molecular contaminations in an outdoor air for an clean room. In various embodiments, the contamination removal membrane includes a first contamination removal pad and a second contamination removal pad oblique to an airflow direction of the outdoor air, and the first nozzle rack perpendicular to the airflow direction of the outdoor air, the second nozzle rack parallel to the first contamination removal pad and the third nozzle rack parallel to the second contamination removal pad.

In various embodiments, the first nozzle rack, the second nozzle rack and the third nozzle rack can spray water on the contamination removal membrane to form water films on the contamination removal membrane so as to catch the airborne molecular contaminations. In various embodiments, the nozzle rack includes a supply pipe, a plurality of spray pipes connecting to the supply pipe and a plurality of nozzles fixed on the spray pipes to spray the water on the contamination removal membrane.

The contamination removal membrane can effectively increase the probability of the water reacting with the airborne molecular contaminations to effectively catch the airborne molecular contaminations in the outdoor air. The nozzles can effectively spray the water to the contamination removal membrane to effectively reduce the amount of the water and the liquid-to-gas ratio (L/G ratio). The airborne molecular contamination removal efficiency can also be a little bit increased due to more water on the zigzag membrane. In addition, a conventional eliminator in the air washer can be saved. Therefore, the pressure drop of the airflow in the air washer can be reduced. The electrical power consumption of the water pump and the air fan are can be both reduced. The total manufacturing cost of the air washer is also reduced.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An air washer, comprising:
   a contamination removal membrane to purify an outdoor air for a clean room, wherein the contamination removal membrane comprises a first contamination removal pad and a second contamination removal pad to form a V-shaped contamination removal membrane;
   a first nozzle rack to spray water on the contamination removal membrane,
   wherein the first nozzle rack further comprises:
   a supply pipe;
   a plurality of spray pipes connecting to the supply pipe; and
   a plurality of nozzles fixed on the spray pipes to spray the water on the contamination removal membrane; and
   auxiliary nozzle racks positioned between the contamination removal membrane and the first nozzle rack, and respectively parallel to the first contamination removal pad and the second contamination removal pad.

2. The air washer of claim 1, wherein the contamination removal membrane comprises a cellulose paper sheet.

3. The air washer of claim 2, wherein a thickness of the cellulose paper sheet is about 250 mm to 350 mm.

4. The air washer of claim 1, wherein the contamination removal membrane comprises a cellulose paper sheet and an agglomeration ceramic pad.

5. The air washer of claim 4, wherein a thickness of the cellulose paper sheet is about 150 mm to 250 mm, and a thickness of the agglomeration ceramic pad is about 50 mm to 150 mm.

6. The air washer of claim 1, further comprising a water recovery tray under the contamination removal membrane, the first nozzle rack and the auxiliary nozzle racks to collect the water.

7. The air washer of claim 1, wherein the nozzles are sector nozzles.

8. The air washer of claim 7, wherein the sector nozzles form an included angle with a vertical direction about 0 degrees to about 30 degrees.

9. The air washer of claim 8, wherein a spray angle of the sector nozzle is about 115 degrees to about 145 degrees.

10. The air washer of claim 1, wherein the nozzles are cone nozzles.

11. The air washer of claim 10, wherein the cone nozzles form an included angle with a vertical direction about 80 degrees to about 100 degrees.

12. The air washer of claim 10, wherein a spray angle of the cone nozzle is about 130 degrees to about 160 degrees.

13. The air washer of claim 1, wherein the contamination removal membrane comprises a cellulose paper sheet and a stainless steel filter.

14. The air washer of claim 1, wherein the contamination removal membrane further comprises a third contamination removal pad, the third contamination removal pad is perpendicular to an airflow direction of the outdoor air, and the first contamination removal pad and the second contamination removal pad are oblique to the airflow direction.

15. An air washer, comprising:
a contamination removal membrane to filter out airborne molecular contaminations in an outdoor air for an clean room, wherein the contamination removal membrane comprises a first contamination removal pad and a second contamination removal pad oblique to an airflow direction of the outdoor air;
a first nozzle rack perpendicular to the airflow direction of the outdoor air; and
auxiliary nozzle racks positioned between the contamination removal membrane and the first nozzle rack, wherein the auxiliary nozzle racks comprise:
a second nozzle rack parallel to the first contamination removal pad; and
a third nozzle rack parallel to the second contamination removal pad;
wherein each of the first nozzle rack, the second nozzle rack, and the third nozzle rack spraying water on the contamination removal membrane to form water films on the contamination removal membrane so as to catch the airborne molecular contaminations, further comprises:
a supply pipe;
a plurality of spray pipes connecting to the supply pipe; and
a plurality of nozzles fixed on the spray pipes to spray the water on the contamination removal membrane.

16. The air washer of claim 15, wherein the contamination removal membrane is a cellulose paper sheet, an agglomeration ceramic pad, a stainless steel filter or a combination thereof.

17. An air washer, comprising:
a contamination removal membrane to filter out airborne molecular contaminations in an outdoor air for a clean room, wherein the contamination removal membrane comprises a first contamination removal pad and a second contamination removal pad oblique to an airflow direction of the outdoor air;
a first nozzle rack to spray water on the contamination removal membrane to form water films on the contamination removal membrane to catch the airborne molecular contaminations; and
auxiliary nozzle racks positioned between the contamination removal membrane and the first nozzle rack, wherein the auxiliary nozzle racks comprise:
a second nozzle rack parallel to the first contamination removal pad; and
a third nozzle rack parallel to the second contamination removal pad,
wherein each of the first nozzle rack, the second nozzle rack, and the third nozzle rack further comprises:
a supply pipe;
a plurality of spray pipes connecting to the supply pipe; and
a plurality of nozzles fixed on the spray pipes to spray the water on the contamination removal membrane.

18. The air washer of claim 17, wherein the contamination removal membrane is a cellulose paper sheet, an agglomeration ceramic pad, a stainless steel filter or a combination thereof.

* * * * *